US012459274B2

(12) United States Patent
Fujino

(10) Patent No.: US 12,459,274 B2
(45) Date of Patent: Nov. 4, 2025

(54) RECORDING APPARATUS CAPABLE OF CHANGING A HEIGHT OF A RECORDING HEAD AND CONTROL METHOD THEREOF

(71) Applicant: CANON KABUSHIKI KAISHA, Tokyo (JP)

(72) Inventor: Kazuhisa Fujino, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 175 days.

(21) Appl. No.: 18/475,071

(22) Filed: Sep. 26, 2023

(65) Prior Publication Data

US 2024/0109341 A1 Apr. 4, 2024

(30) Foreign Application Priority Data

Sep. 29, 2022 (JP) ................................ 2022-156174

(51) Int. Cl.
*B41J 11/20* (2006.01)
*B41J 11/00* (2006.01)
*B41J 11/04* (2006.01)
*B41J 25/304* (2006.01)
*B41J 25/308* (2006.01)

(52) U.S. Cl.
CPC ............ *B41J 11/20* (2013.01); *B41J 11/0035* (2013.01); *B41J 11/005* (2013.01); *B41J 11/04* (2013.01); *B41J 25/304* (2013.01); *B41J 25/308* (2013.01)

(58) Field of Classification Search
CPC ....... B41J 11/20; B41J 11/0035; B41J 11/005; B41J 11/04; B41J 25/304; B41J 25/308
See application file for complete search history.

(56) References Cited

U.S. PATENT DOCUMENTS 5,220,350 A * 6/1993 Fujii ........................ B41J 2/365 347/211
5,480,238 A * 1/1996 Nakano .................. B41J 13/223 400/625

FOREIGN PATENT DOCUMENTS

JP H0852870 A 2/1996
JP 2009233901 A 10/2009
JP 2018001502 A 1/2018

* cited by examiner

*Primary Examiner* — Henok D Legesse
(74) *Attorney, Agent, or Firm* — Canon U.S.A., Inc. IP Division

(57) ABSTRACT

A recording apparatus includes discharge rollers configured to perform a discharge operation of discharging a recording medium on which an image has been recorded by a recording head to the outside of the recording apparatus, and a height-change member configured to change a height of the recording head in parallel with the discharging operation.

20 Claims, 13 Drawing Sheets

| HEAD-TO-MEDIUM DISTANCE | USE |
|---|---|
| WIDE | ENVELOP PRINTING |
| STANDARD | PLAIN PAPER PRINTING, HEAD CAPPING |
| NARROW | PHOTO PAPER PRINTING |

RECORDING APPARATUS CAPABLE OF CHANGING A HEIGHT OF A RECORDING HEAD AND CONTROL METHOD THEREOF

BACKGROUND

Field of the Disclosure

The present disclosure relates to a recording apparatus and a control method thereof.

Description of the Related Art

Conventionally, inkjet printers have been adapted to record on various media by adjusting the height of the recording head. Japanese Patent Application Laid-Open No. H08 (1996)-52870 discloses a configuration in which, in printing on a thick envelope, a carriage on which a recording head is mounted is raised to increase the distance between a medium and the recording head, thereby preventing the medium and the recording head from rubbing against each other. In addition, in printing on glossy paper, for which printing accuracy is required, control is performed to reduce the distance between the medium and the recording head by lowering the height of the carriage on which the recording head is mounted.

However, since the raising and lowering operation of the carriage takes time, there is a concern that productivity may decrease in a case where recording is performed on various media in which the height of the carriage needs to be changed.

SUMMARY

In view of the foregoing issue, some embodiments of the present disclosure are directed to providing a recording apparatus that does not reduce productivity even when recording is performed on various media.

According to an aspect of the present disclosure, a recording apparatus includes discharge rollers configured to perform a discharge operation of discharging a recording medium on which an image has been recorded by a recording head to the outside of the recording apparatus, and a height-change member configured to change a height of the recording head in parallel with the discharging operation.

Further features of various embodiments will become apparent from the following description of exemplary embodiments with reference to the attached drawings.

DESCRIPTION OF THE EMBODIMENTS

Exemplary embodiments of the present disclosure will now be described with reference to the drawings. However, the following exemplary embodiments are not intended to limit every embodiment, and all combinations of features described in the exemplary embodiments are not necessarily essential to the solutions of the present disclosure. In addition, relative arrangements, shapes, and the like of constituent elements described in the exemplary embodiments are merely examples, and are not intended to limit the scope of every embodiment thereto. In each drawing, arrows A, B, C, and D each indicate a horizontal direction, and arrows E and F indicate vertical directions.

“Recording” includes not only a case where significant information, such as characters and figures, is formed but also a case where an image, a design, a pattern, or the like is widely formed on a recording medium, or a case where a medium is processed. The information can be either significant or insignificant and the information does not necessarily need to be visualized so as to be visually perceived by a human being. Further, in the present exemplary embodiment, paper is assumed as the “recording medium”, but cloth, plastic film, or the like may be used.

In addition, “ink” (also referred to as “liquid”) should be broadly interpreted similarly to the definition of “recording” described above. Therefore, the ink refers to a liquid that can be used for forming an image, a design, a pattern, or the like, processing a recording medium, or processing an ink (for example, solidification or insolubilization of a coloring material in an ink applied to a recording medium) by being applied onto the recording medium.

Figure 1:
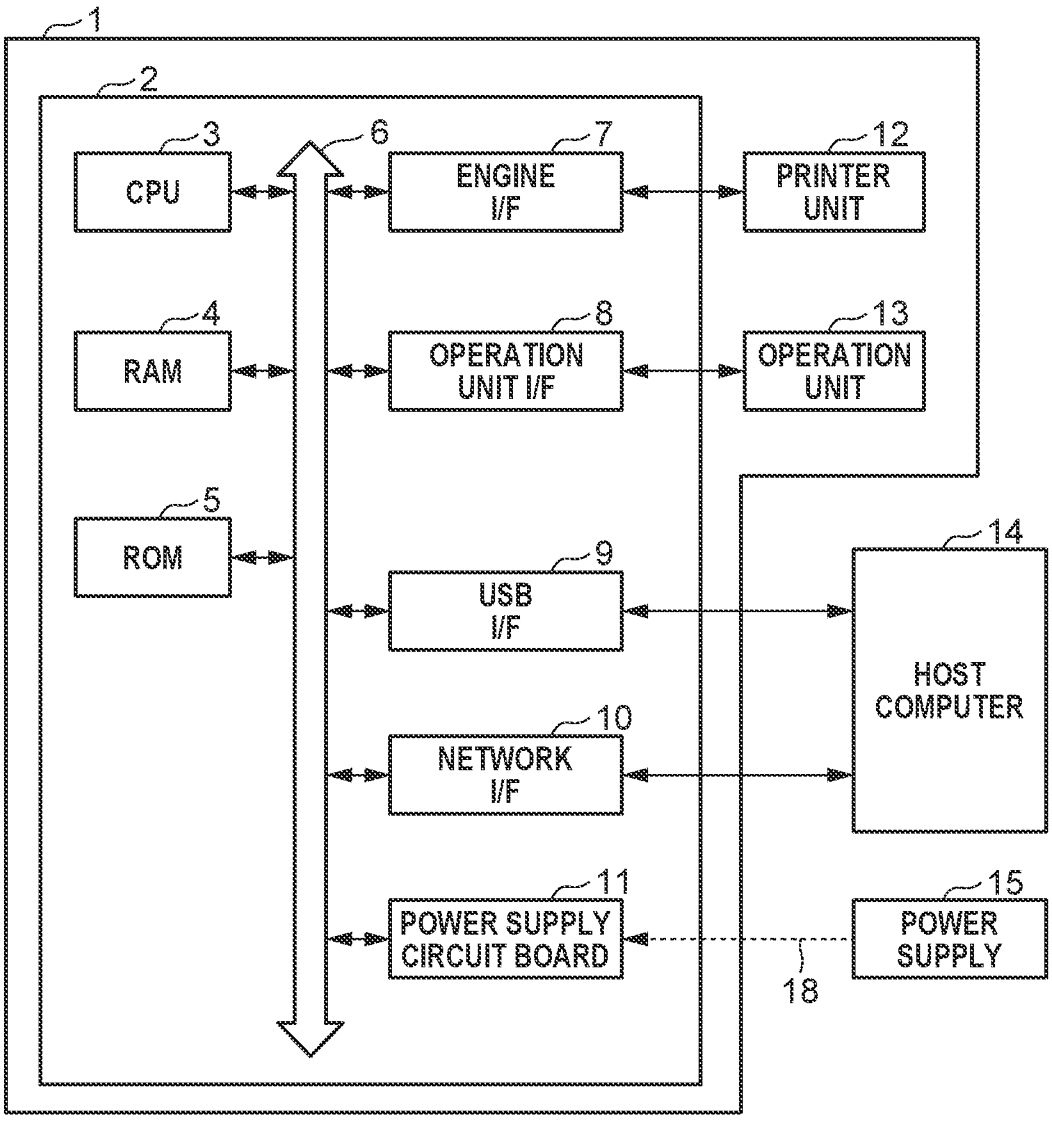
FIG. 1 is a block diagram illustrating a hardware configuration of a recording apparatus according to a first exemplary embodiment.

FIG. 1 is a block diagram illustrating a hardware configuration of a recording apparatus 1 in the first exemplary embodiment.

The recording apparatus 1 uses a central processing unit (CPU) 3 in a control unit 2 to load a control program recorded in a read-only memory (ROM) 5 into a random access memory (RAM) 4, read the control program as necessary, and perform various types of control, such as power-on control and recording control.

The RAM 4 is a main memory of the CPU 3, and is used as a work area or a temporary storage area for loading various programs stored in the ROM 5. The ROM 5 stores image data, various programs, and various setting information. Although a flash storage or the like is assumed as the ROM 5 in the exemplary embodiment of FIG. 1, an auxiliary storage device, such as a hard disk, may be used.

In the recording apparatus 1, one CPU 3 uses one memory (RAM 4) to execute each process shown in flowcharts to be described below, but another mode may be adopted. For example, a plurality of CPUs or a plurality of RAMs, ROMs, and storages may cooperate with each other to execute each process illustrated in the flowcharts described below. Further, a part of the processing may be executed using a hardware circuit.

An engine interface (I/F) 7 connects a printer unit 12 and the control unit 2 to each other via a bus line 6. An image to be recorded by the printer unit 12 is transferred from the control unit 2 via the engine OF 7 and recorded on a recording media, such as a sheet in the printer unit 12.

An operation unit OF 8 connects an operation unit 13 and the control unit 2 to each other via the bus line 6. The operation unit 13 includes a liquid crystal display unit having a touch panel function, operation keys, and the like. The operation unit 13 functions as a reception unit that receives an instruction from a user.

A universal serial bus (USB) OF 9 and a network OF 10 control communication with a host computer 14 connected to the recording apparatus 1. A power supply circuit board 11 transforms power supplied from a power supply 15 via a power supply cable 18 and supplies the transformed power to the recording apparatus 1. The power supply circuit board 11 may include a storage battery capable of storing electric power. The above is a description of a hardware configuration of the recording apparatus 1.

Figure 2:
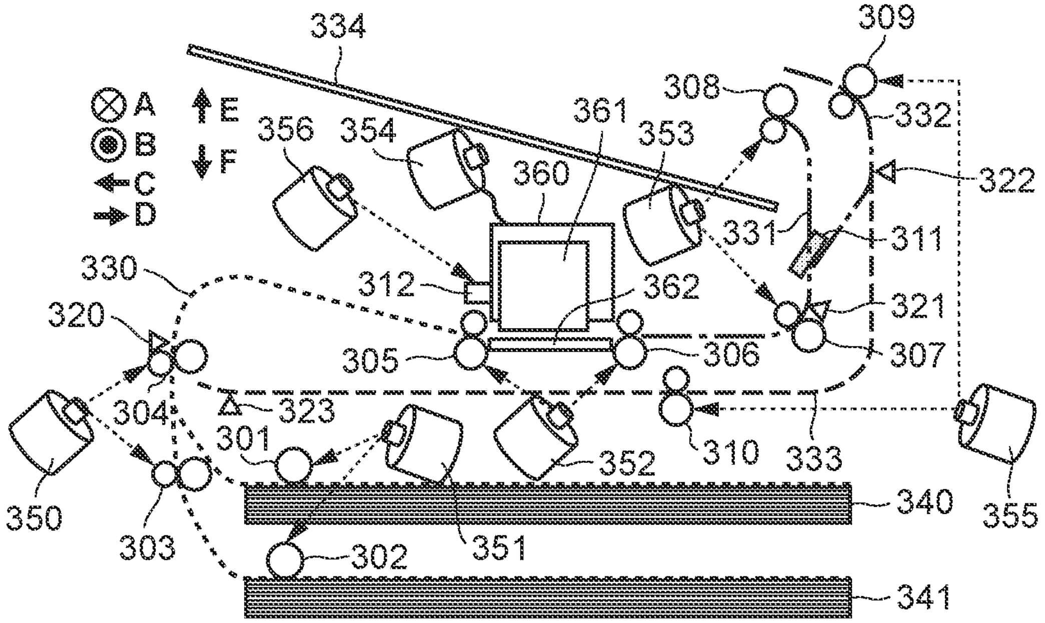
FIG. 2 is a cross-sectional view illustrating a conveyance path according to the first exemplary embodiment.

FIG. 2 is a cross-sectional view illustrating the conveyance path of the recording apparatus 1. In FIG. 2, the left side is the front side of the recording apparatus 1, and the right side is the back side of the recording apparatus 1. In other words, the direction A and the direction B are left-right directions when the recording apparatus 1 is viewed from the front, the direction C corresponds to a direction toward the front surface of the recording apparatus 1, and the direction D corresponds to a direction toward the rear surface of the recording apparatus 1. Further, the direction E is an upward direction in one vertical direction, and the direction F is a downward direction in the other vertical direction (gravity direction).

The recording apparatus 1 includes feeding rollers 301 and 302, conveying rollers 303 and 304, and printing rollers 305 and 306 as conveying units of the recording medium. The recording apparatus 1 further includes discharge rollers 307 and 308 as discharge units, and reversing rollers 309 and 310 as reversing units that reverse the recording medium.

In addition, there are provided a recording head 361 as a recording unit which performs recording by ejecting liquid, and a carriage 360 which moves in the direction A and the direction B (predetermined directions) while carrying and supporting the recording head 361. The recording apparatus 1 of the present exemplary embodiment uses an ink jet type recording head 361. Here, the direction A is a direction toward the back side of FIG. 2, and the direction B is a direction opposite to the direction A toward the front side of FIG. 2. The carriage 360 is movably supported by a rail 630 (see FIG. 3) extending in the direction A (direction B). An image is recorded on a recording medium by ejecting ink as liquid from the recording head 361 while the carriage 360 moves in the direction A and the direction B. Note that the recording head (recording unit) of the present disclosure is not limited to this, and a line head provided with ejection ports for ejecting liquid over a length corresponding to the width of the recording medium can also be employed.

A platen 362 that supports the back surface of a recording medium on the front surface of which recording is performed by the recording head 361 is provided at a recording position facing the recording head 361. The recording apparatus 1 also includes a height-change member 312 that switches the distance between the platen 362 and the ejection surface of the recording head 361 on which the ejection openings for ejecting liquid are provided.

The recording apparatus 1 includes a first cassette 340 and a second cassette 341 as accommodation units capable of accommodating a recording medium. In the recording apparatus 1, the second cassette 341 is provided below the first cassette. The first cassette 340 and the second cassette 341 are configured to be inserted into and removed from the recording apparatus 1 so that a user can set a recording medium. The recording apparatus 1 also includes a discharge tray 334 that supports the recording medium on which recording has been performed by the recording head 361.

Furthermore, the recording apparatus 1 includes a feeding motor 351 that drives the feeding rollers 301 and 302, a conveyance motor 350 that drives the conveyance rollers 303 and 304, and a printing motor 352 that drives the printing rollers 305 and 306 as driving sources (driving units). In addition, the recording apparatus 1 includes a discharge motor 353 that drives the discharge rollers 307 and 308, a carriage motor 354 that drives the carriage 360, and a reversing motor 355 that drives the reversing rollers 309 and 310. The recording apparatus 1 also includes a switching motor 356 that drives the height-change member 312. The recording apparatus 1 further includes detection sensors 320, 321, 322, and 323 capable of detecting an end portion of the recording medium.

When the recording apparatus 1 receives a recording command via the host computer 14 or the operation unit 13, the CPU 3 rotates the feeding motor 351 in the forward direction to drive the feeding roller 301, and feeds the recording media stacked in the first cassette 340 one by one. When the recording medium is fed from the second cassette 341, the CPU reversely rotates the feeding motor 351 to drive the feeding roller 302, thereby feeding the recording medium stacked on the second cassette 341 one by one. In the present exemplary embodiment, the feeding rollers 301 and 302 are driven by the same feeding motor 351, but motors serving as different driving sources may be provided for the respective rollers.

The fed recording medium is conveyed by the conveyance roller 304 driven by the conveyance motor 350 along a conveyance path 330 indicated by the dotted line in FIG. 2 toward the printing roller 305. In the present exemplary embodiment, a detection sensor 320 is provided on the downstream side of the conveyance roller 304 in the conveyance direction, and can detect a passage of the leading edge of the recording medium through the conveyance roller 304. The CPU 3 manages positions of the recording media in the recording apparatus 1 based on the detection result.

Next, the CPU 3 causes the printing motor 352 to rotate in the forward direction to drive the printing rollers 305 and 306 and convey the recording media in the conveyance direction (here, the arrow D direction). When the recording medium is conveyed to the recording position, the printing motor 352 is stopped to stop the conveyance of the recording medium by the printing rollers 305 and 306. Thereafter, the CPU 3 drives the carriage motor 354 to move the carriage 360, and ejects ink from the recording head 361 as a recording unit mounted on the carriage 360 to record an image. In this way, by repeating the intermittent conveyance of the recording medium by a predetermined amount and the ejection of ink by the recording head 361 in accordance with the movement of the carriage 360, recording of an image is completed based on the received recording command.

The CPU 3 drives the discharge motor 353 in parallel with the recording operation by the recording head 361 to drive the discharge rollers 307 and 308. The recording medium on which the recording operation by the recording head 361 has been completed is discharged to a discharge tray 334 by discharge rollers 307 and 308. In the present exemplary embodiment, a detection sensor 321 is provided on the downstream side of the discharge roller 307, and can detect a passage of the trailing edge of the recording medium through the discharge roller 307. Based on this detection result, the CPU 3 controls the driving speed of the discharge motor 353 when discharging the recording media, thereby improving the discharge alignment of the recording media.

In addition, when performing double-sided recording in which recording is performed on both the first side and the second side of the recording media, the CPU 3 drives a conveyance path switching flapper 311 after detecting the leading edge of the recording media on which recording has been performed on the first side by the detection sensor 321. By this driving, the conveyance path switching flapper 311 closes the conveyance path to the discharge tray 334 and guides the recording medium to a reversing path 332.

The CPU 3 drives the conveyance path switching flapper 311 to open the conveyance path to the discharge tray 334 again after the leading edge of the recording media is detected by the detection sensor 322, which means that guiding of the recording media to the reversing path 332 is completed. In addition, the CPU 3 rotates the reversing motor 355 in the forward direction to rotate the reversing roller 309 in the forward direction, and conveys the recording media from the discharge roller 307 in the direction of the reversing roller 309.

The CPU 3 stops the reversing motor 355 after the trailing edge of the recording media is detected by the detection sensor 322. Then, the CPU 3 drives the reversing motor 355 in the reverse direction to rotate the reversing rollers 309 and 310 in the reverse direction, thereby drawing the recording material from the reversing path 332 to a second surface path 333. After the detection sensor 323 detects the leading edge of the recording media, the CPU 3 rotates the conveyance motor 350 in the forward direction to convey the recording media toward the recording position (platen 362) so that the second surface of the recording media faces the ejection surface of the recording head 361. After that, the CPU 3 completes the recording on the second surface by the same control as that at the time of recording on the first surface, and discharges the recording material to the discharge tray 334.

When the distance between the ejection surface of the recording head 361 and the platen 362 is changed according to the type of the recording medium, the recording apparatus 1 drives the switching motor 356 to cause the height-change member 312 to protrude into the movement path of the carriage 360. Detailed control of switching will be described with reference to FIG. 10.

Figure 3:
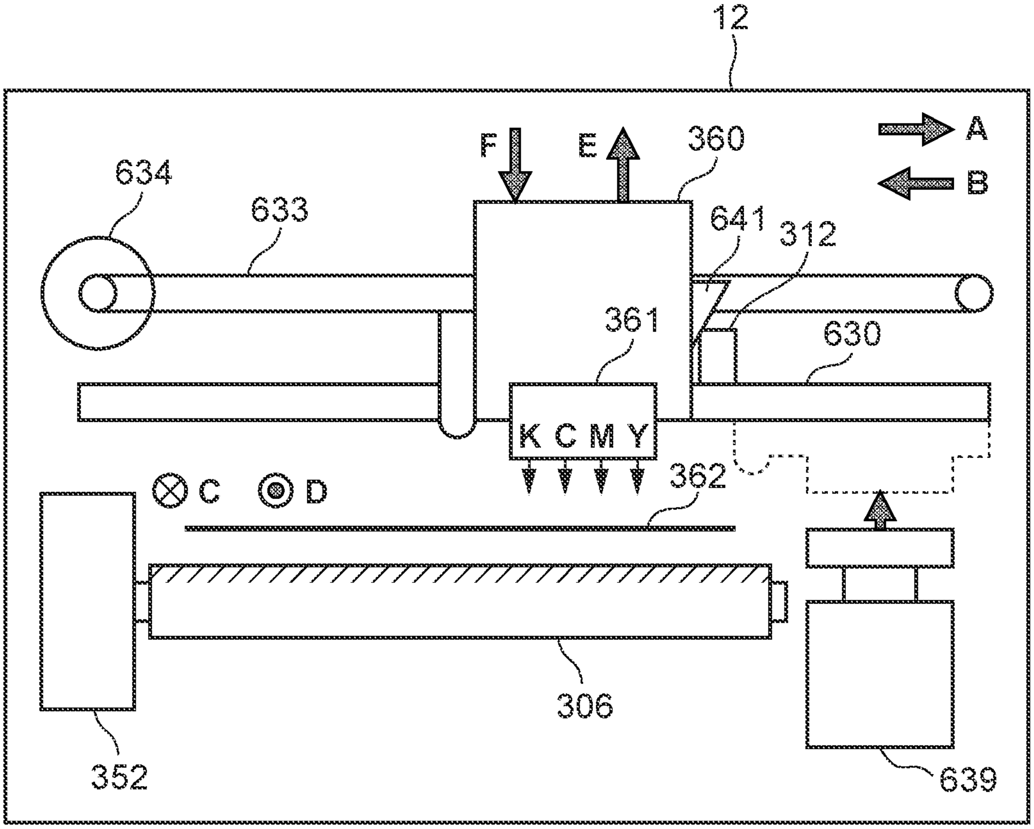
FIG. 3 is a schematic cross-sectional view of the periphery of a printer unit according to the first exemplary embodiment when viewed from the back side of the recording apparatus.

FIG. 3 is a schematic cross-sectional view of the periphery of the printer unit 12 involved in recording as viewed from the back side of the recording apparatus 1. The recording apparatus 1 includes a rail 630, a belt 633, and an encoder 634 as a configuration for moving the carriage 360. The rail 630 extends in the direction A (direction B) and movably supports the carriage 360. The CPU 3 drives the belt 633 by driving the carriage motor 354 to move the carriage 360 in the direction A or the direction B. The CPU 3 can calculate the position of the carriage 360 by reading the encoder 634. The recording apparatus 1 further includes a cap unit 639 that caps the ejection surface of the recording head 361, and a contact member 641 that is provided on the carriage 360 and can come into contact with the height-change member 312.

As described above, the recording apparatus 1 changes the distance between the ejection surface of the recording head 361 and the platen 362 according to the type of the recording medium. For example, when recording is performed on photographic paper, the carriage 360 is moved (lowered) in the direction F in order to reduce the distance between the ejection surface of the recording head 361 and the platen 362 in order to improve the ejection accuracy. On the other hand, when recording is performed on a thick sheet, such as an envelope, the carriage 360 is moved (raised) in the direction E in order to avoid rubbing between the ejection surface of the recording head 361 and the recording medium.

In addition, the CPU 3 moves the carriage 360 to a position where the recording head 361 faces the cap unit 639 after completion of recording so that the ejection ports of the recording head 361 are not dried to cause an ejection failure. Then, as illustrated in FIG. 3, control is performed to move (raise) the cap unit 639 in the direction E and cap the ejection surface of the recording head 361 with the cap unit 639.

Here, in a case where the carriage 360 is set at a position higher than the predetermined position, even when the cap unit 639 ascends in the direction E, it is not possible to cap the ejection surface of the recording head 361. Therefore, before capping by the cap unit 639, the position of the carriage 360 in the vertical direction needs to be changed to a predetermined position.

In order to change the position (height) of the carriage 360, the CPU 3 drives the switching motor 356 to cause the height-change member 312 to protrude into the movement path of the carriage 360. Thereafter, the CPU 3 drives the carriage motor 354, and the contact member 641 provided on the carriage 360 comes into contact with the height-change member 312, whereby the carriage 360 is lifted in the direction E.

The raised carriage 360 is secured in height by engagement with the rail 630. In this way, the position of the carriage 360 in the height direction is changed according to the amount by which the contact member 641 is pressed against the height-change member 312 by driving the carriage 360. Then, when the contact of the contact member 641 with the height-change member 312 is continued, the carriage 360 comes off the rail 630 and is fixed at the lowest position in the height direction.

Figure 13:
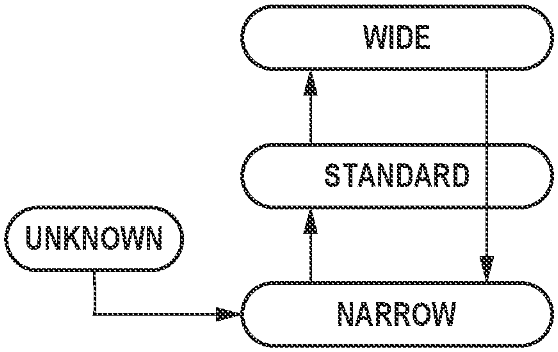
FIG. 13 is a conceptual diagram illustrating transition of changing the height of the carriage according to the first exemplary embodiment.

FIG. 13 is a conceptual diagram illustrating the transition of changing the height of the carriage 360. As illustrated in FIG. 13, in this exemplary embodiment, the height of the carriage 360 can be changed in three stages. By the contact of the contact member 641 with the height-change member 312, the height of the carriage 360 is changed in the order of the lowest position (narrow)→the middle position (standard)→the highest position (wide)→the lowest position (narrow). Even in an unknown state in which the recording apparatus 1 cannot recognize the height of the carriage 360, the height of the carriage 360 can be changed to the lowest position (narrow) by continuing the contact of the contact member 641 with the height-change member 312.

It should be noted that the lowest position (narrow) is a height corresponding to photographic paper printing, and the middle position (standard) corresponds to plain paper printing or a position capped by the cap unit 639. The highest position (wide) is a height corresponding to thick paper in envelope printing or the like.

Figure 4:
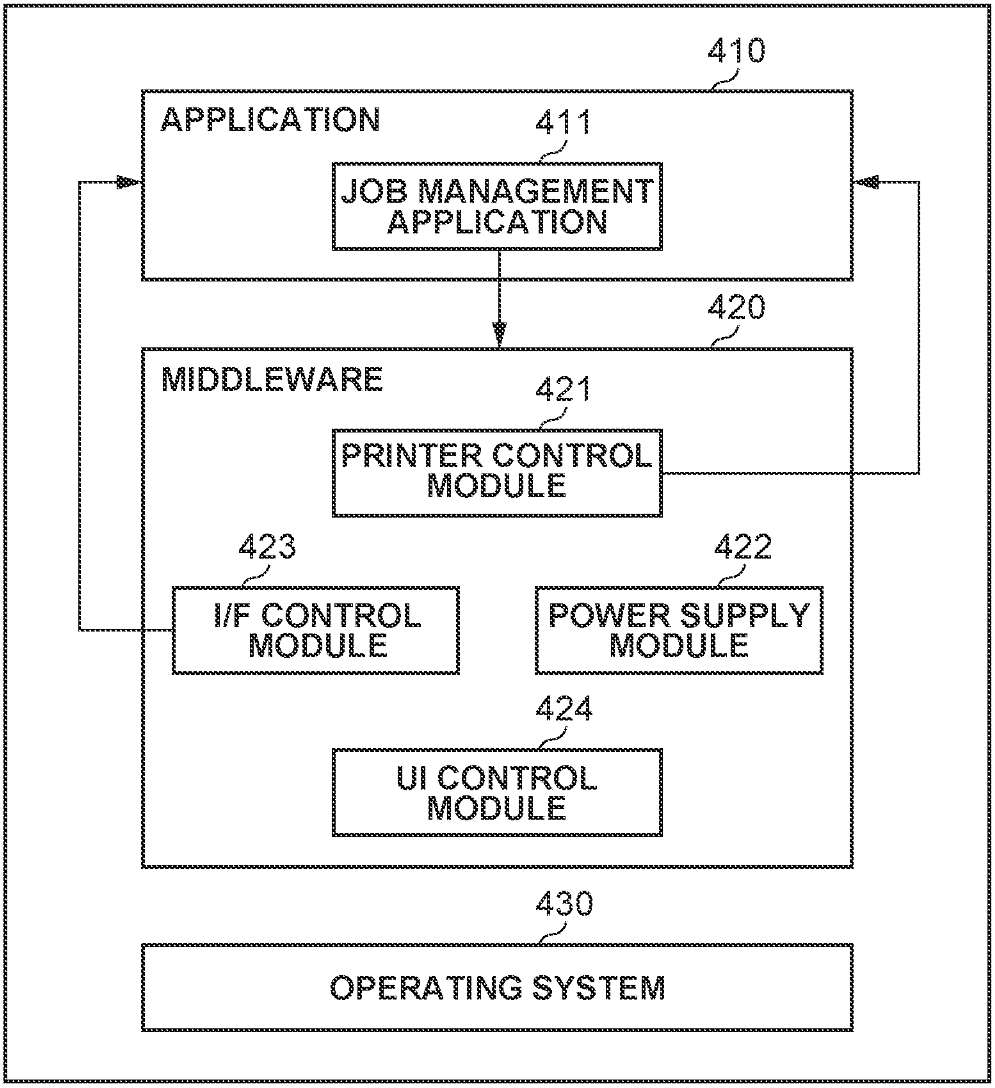
FIG. 4 is a diagram illustrating a software configuration of the recording apparatus according to the first exemplary embodiment.

Next, a software configuration of the recording apparatus 1 will be described with reference to FIG. 4. FIG. 4 is a software configuration diagram of a control program for controlling each hardware module loaded in the RAM 4 in the present exemplary embodiment.

The control program is roughly divided into three blocks. These layers include an application layer 410 for managing applications, a middleware layer 420 for controlling the apparatus via various I/Fs, and an operating system 430 for managing overall control. Their roles will be described.

The operating system 430 provides basic functions for executing control programs in the control unit 2. The middleware layer 420 includes a software group that controls I/Fs with the recording apparatus 1 (printer) and each physical device. In this exemplary embodiment, a printer control module 421 is provided as a module for controlling the engine OF 7. Similarly, there is a power supply module 422 as a module for controlling the power supply circuit board 11.

The middleware 420 also includes an I/F control module 423 that controls the USB OF 9 and the network OF 10 as devices used for communication with the host computer 14, a UI control module 424 that controls the operation unit OF 8, and the like.

The application layer 410 implements a function, such as a recording operation executed by the recording apparatus 1, by operating each device via each piece of middleware. For example, when the UI control module 424 detects an issue of an instruction of recording by the user via the operation unit 13 and the operation unit OF 8, the application layer 410 is notified of the detection. In response, the application layer 410 executes a job management application 411 for recording. The job management application 411 uses the printer control module 421 of the middleware layer 420 to execute a printing operation at the printer unit 12.

Figure 5:
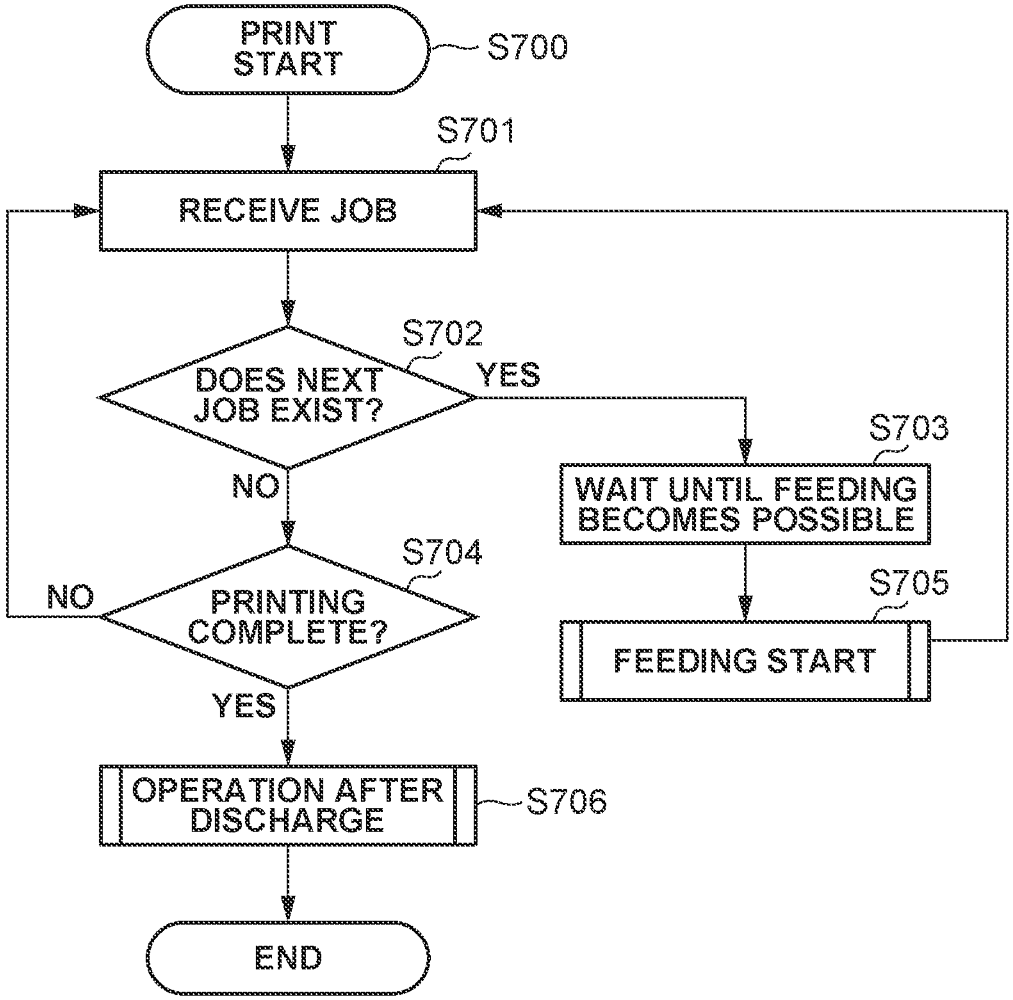
FIG. 5 is a flowchart illustrating a recording control procedure of the recording apparatus according to the first exemplary embodiment.

FIG. 5 is a recording control procedure assuming that recording jobs are continuously input from the host computer 14. In step S701, the job management application 411 controls the OF control module 423 to receive a recording job. In step S702, the job management application 411 checks whether the next job has been received in step S701.

If the next job exists (YES in step S702), in step S703, the process waits until a recording medium corresponding to the recording job received in step S701 can be fed. More specifically, it waits until the trailing edge of the recording medium corresponding to the last page of the job currently being recorded passes the detection sensor 320. At the timing when the trailing edge of the recording medium passes the detection sensor 320, the next recording medium can be fed. By detecting the trailing edge of the recording medium by the detection sensor 320 in this manner, the length of the recording medium set in the first cassette 340 can be managed with high accuracy. In addition, the leading edge of the next recording medium is also detected by the detection sensor 320, so that the position of the recording medium in the recording apparatus 1 can be managed.

When feeding of the recording medium becomes possible, in step S705, the procedure of starting feeding of the recording medium is executed in order to record the job received in step S701. When the feeding is completed and the recording operation by the recording head 361 starts, the process returns to the next job receiving process in step S701.

If it is determined in step S702 that there is no next job (NO in step S702), in step S704, it is determined whether printing for the job currently being executed is completed. If printing is still being executed, the process returns to step S701 to receive the next job again. On the other hand, if it is determined in step S704 that printing for the current job is completed, in step S706, the procedure of the post-discharge operation is executed.

Figure 6:
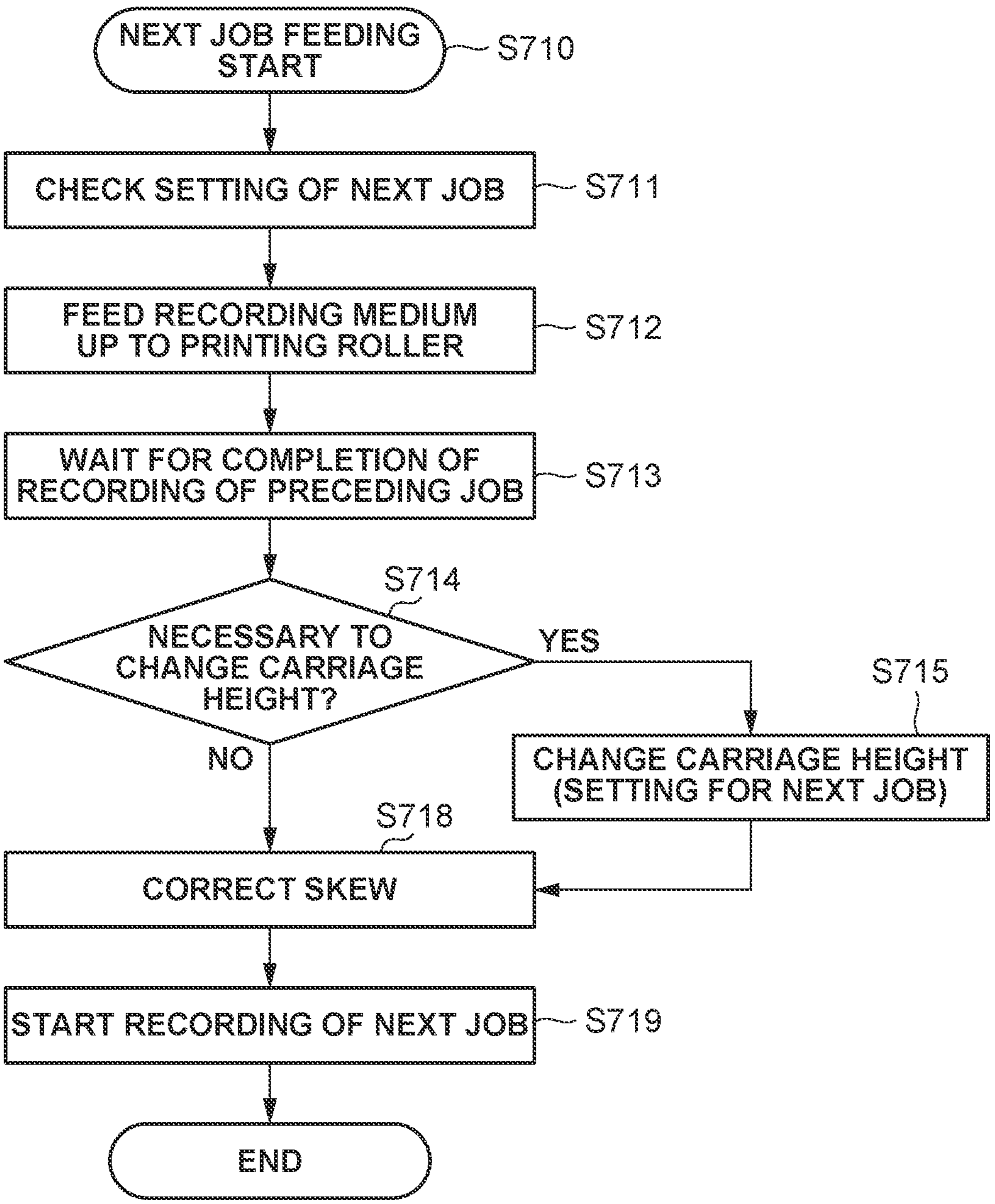
FIG. 6 is a flowchart illustrating a feeding operation of the recording apparatus according to the first exemplary embodiment.

FIG. 6 is a control procedure relating to the start of feeding of the recording medium corresponding to the next job executed in step S705 of FIG. 5. First, in step S711, the job management application 411 checks the setting of the next job received by the OF control module 423.

Then, in step S712, the job management application 411 controls the printer control module 421 to feed the recording medium from a cassette storing the recording medium corresponding to the setting of the next job and convey (feed) the recording medium up to the printing roller 305. For example, in a case where the recording medium corresponding to the job setting is set in the first cassette 340, the feeding motor 351 is driven to rotate the feeding roller 301 in the forward direction to feed one piece of recording medium. Then, the conveyance motor 350 is rotated in the forward direction to rotate the conveyance roller 304 in the forward direction to convey the recording medium up to the printing roller 305, and the conveyance motor 350 is stopped.

After the leading edge of the recording medium is detected by the detection sensor 320, the feeding motor 351 is stopped. This is because the conveyance of the recording medium is performed by the conveyance motor 350, and thus the recording medium can be conveyed without driving the feeding motor 351. In particular, when feeding a short recording medium, if the feeding motor 351 continues to be driven, the next recording medium is fed from the cassette, and thus it is necessary to stop the feeding motor 351.

During feeding of a recording medium, a preceding recording medium conveyed prior to the recording medium is being recorded, or is being discharged after completion of recording. In the present exemplary embodiment, when the preceding recording medium is being recorded, the conveyance of the preceding recording medium may be temporarily stopped due to the intermittent conveyance for the recording operation. At this time, if the conveyance of the recording medium fed after the preceding recording medium is continued, the leading edge of the fed recording medium collides with the trailing edge of the print medium being recorded. Therefore, it is necessary to maintain a certain distance or more between the trailing edge of the preceding recording medium and the leading edge of the fed recording medium.

In the present exemplary embodiment, when the distance between the trailing edge of the preceding recording medium and the leading edge of the subsequent recording medium becomes shorter than a certain distance, the conveyance motor 350 is stopped. On the other hand, if the distance between the trailing edge of the preceding recording medium and the leading edge of the subsequent recording medium becomes longer than the predetermined distance, the conveyance motor 350 is driven again. In this way, after the recording medium is fed up to the printing roller 305, in step S713, the process waits for completion of recording on the preceding recording medium.

Next, the job setting checked in step S711 is compared with the job setting for the job currently being recorded, and in step S714, it is determined whether height changing of the carriage 360 is necessary. As an example in which height changing is necessary, there is a case where recording on photographic paper is performed at a position where the carriage height is the lowest, and envelope printing is instructed for the next job. If it is determined that height-change is necessary (YES in step S714), in step S715, the height of the carriage 360 is changed in accordance with the setting of the next job. Note that the changing of the carriage height here is performed in parallel with the discharge of the preceding recording medium and the feeding of the subsequent recording medium. Details of the height-change control in step 715 will be described below with reference to FIG. 8.

After the height change in step 715 or when it is determined that the height-change is not necessary in step 714 (NO in step S714), in step S718, a skew correction operation is performed to suppress skew of the recording medium.

Specifically, the skew of the recording medium is corrected by rotating the conveyance motor 350 in the forward direction to drive the conveyance roller 304 to advance the recording medium, causing the leading edge of the recording medium to abut against the stopped printing roller 305 to correct the skew of the recording medium. Thereafter, in step S719, recording of the next job is performed on the recording medium by the recording head 361.

Figure 7:
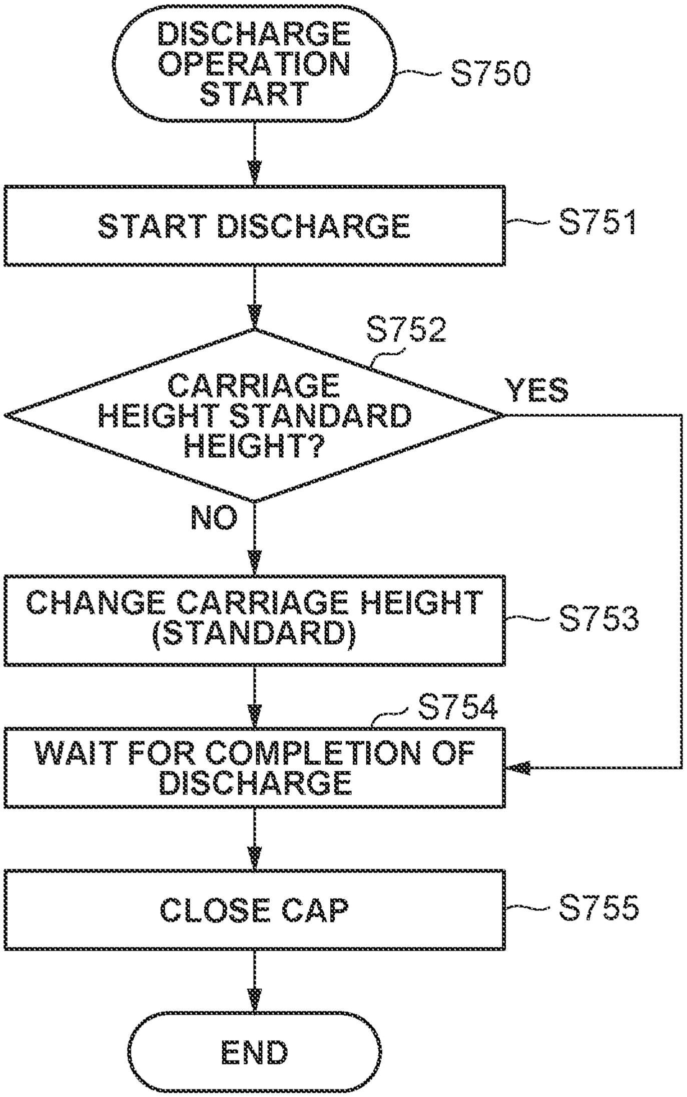
FIG. 7 is a flowchart illustrating a discharge operation of the recording apparatus according to the first exemplary embodiment.

FIG. 7 is a control procedure of the discharge operation in step S706 of FIG. 5. This procedure is executed when the recording of the job currently being recorded is completed in step S704 of FIG. 5. In step 751, discharge of the recording medium is started. Specifically, the printing motor 352 is driven to rotate in the forward direction, and the printing rollers 305 and 306 are rotated in the forward direction. Further, the discharge motor 353 is driven to rotate in the forward direction to rotate the discharge rollers 307 and 308 in the forward direction. As a result, the recording medium is finally discharged to the discharge tray 334.

While the discharge operation is started, in step S752, it is checked whether the current carriage height is a position (standard setting) at which the cap unit 639 can cap the recording head. If the head-to-medium setting is not the standard setting (NO in step S752), in step S753, the height of the carriage 360 is changed to the standard setting by the above-described contact between the height-change member 312 and the contact member 641. Here, the height-change operation in step S753 is performed in parallel with the discharge operation of the recording medium started in step S751. Then, in step S754, the process waits until the preceding recording medium is discharged to the discharge tray 334 and the discharge operation is completed. After completion of the discharging operation, in step S755, cap closing for capping the recording head 361 is performed.

Figure 8:
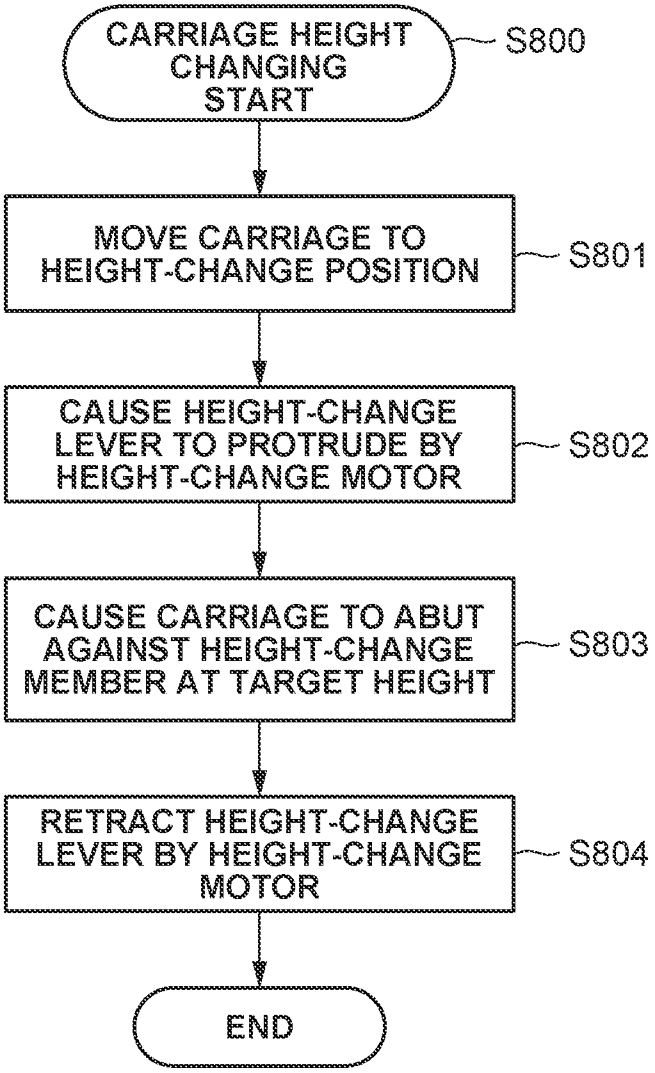
FIG. 8 is a flowchart illustrating a height change operation of the carriage according to the first exemplary embodiment.

FIG. 8 is a control procedure for carriage height changing. This control is executed in step S715 of FIG. 6 and step S753 of FIG. 7. First, in step S801, the carriage motor 354 is driven to move the carriage 360 in the direction A (or the direction B) to a height-change position at which the height can be changed. As described above, in the present exemplary embodiment, the height of the carriage 360 can be changed at a predetermined position (height-changing position) in the movement path of the carriage 360.

Next, in step S802, the switching motor 356 for changing the carriage height is driven to cause the height-change member 312 to protrude. Then, in step S803, the carriage 360 is driven to bring the contact member 641 into contact with the protruding height-change member 312, thereby changing the carriage height to a target height. As described above, the carriage height can be adjusted in accordance with the amount by which the contact member 641 is pressed against the height-change member 312. Finally, in step S804, the switching motor 356 is driven to retract the height-change member 312 to the original retracted position.

As described above, in a case where there is a job to be recorded next and it is necessary to change the carriage height, the carriage height is changed in parallel with the feeding operation and the discharging operation of the recording medium. If there is no job to be recorded next and it is necessary to change the carriage height for capping, the carriage height is changed in parallel with the discharge operation of the recorded recording medium. As a result, it is possible to improve throughput or productivity until completion of recording on the recording medium.

In the present exemplary embodiment, in a case where there is a job to be recorded next and the carriage height needs to be changed, both the feeding operation and the discharging operation of the recording medium are performed in parallel with the carriage height changing. However, the present disclosure is not limited to this configuration. That is, even in a configuration in which the operation is performed in parallel with the feeding operation or the discharging operation of the recording medium, it is possible to obtain the same effect, such as improvement in throughput or productivity.

In the first exemplary embodiment, the configuration in which the carriage height changing is performed using the dedicated switching motor 356 has been described. In a second exemplary embodiment, a mode in which the height of the carriage is changed using the printing motor 352 will be described. In the second exemplary embodiment, the configuration of the recording apparatus 1 and the control procedure illustrated in FIG. 5 are the same as those in the first exemplary embodiment, and thus description thereof will be omitted.

Figure 9:
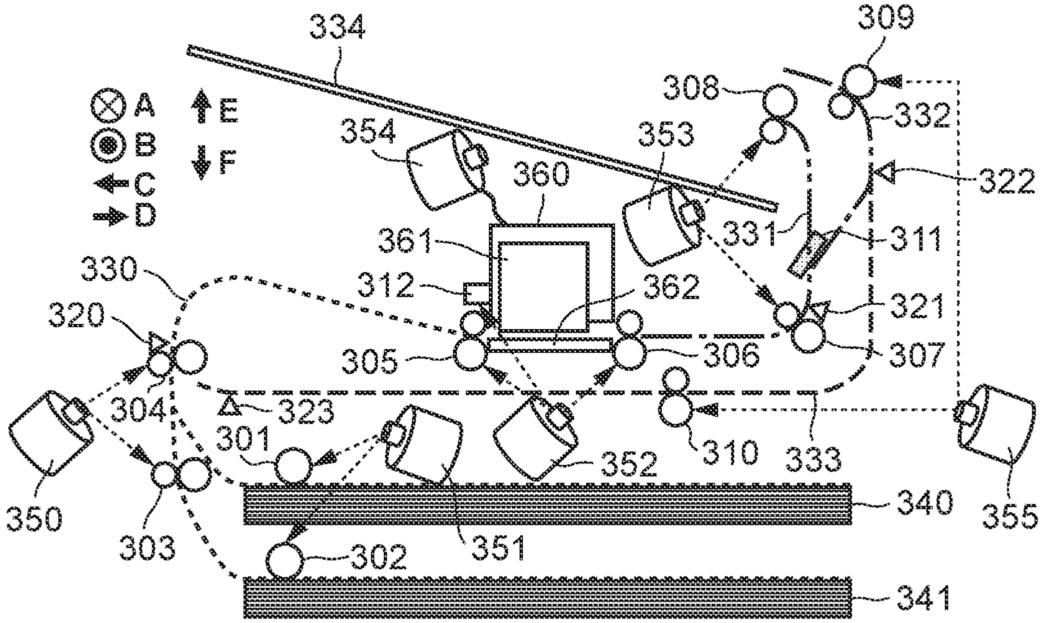
FIG. 9 is a cross-sectional view illustrating a conveyance path according to a second exemplary embodiment.

FIG. 9 is a cross-sectional view illustrating a conveyance path of a recording apparatus 1 in the second exemplary embodiment. A configuration is illustrated in which reverse rotation driving of the printing motor 352 is used as a driving source for causing the height-change member 312 to protrude. In the first exemplary embodiment, the dedicated switching motor 356 is required. However, in the present exemplary embodiment, since the number of motors is reduced, it is possible to reduce the cost and the size of the recording apparatus 1.

Figure 12:
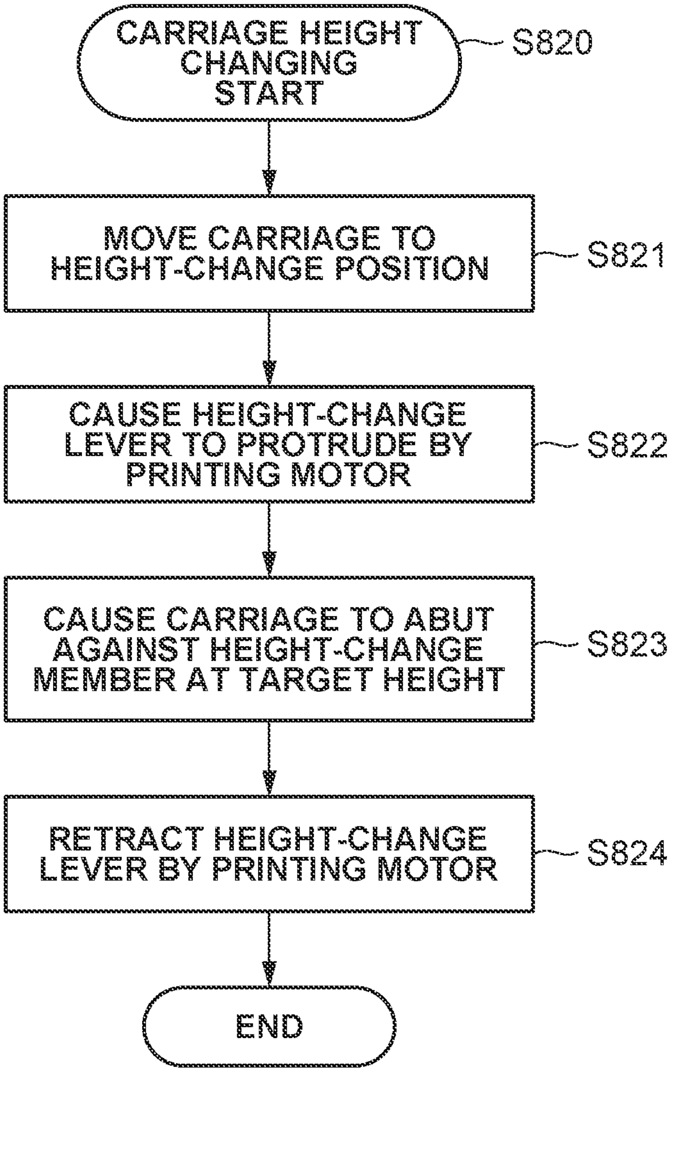
FIG. 12 is a flowchart illustrating a height change operation of a carriage according to the second exemplary embodiment.

FIG. 12 is a control procedure of carriage height changing in the second exemplary embodiment. First, in step S821, the carriage motor 354 is driven to move the carriage 360 to the switching position in the direction A (or the direction B). Then, in step S822, the printing motor 352 is driven in the reverse direction to cause the height-change member 312 to protrude. Then, in step S823, the carriage 360 is driven to bring the contact member 641 into contact with the protruding height-change member 312, thereby changing the carriage height to a target height. Finally, in step S824, the printing motor 352 is driven in the forward direction to retract the height-change member 312 to the original retracted position.

Figure 10:
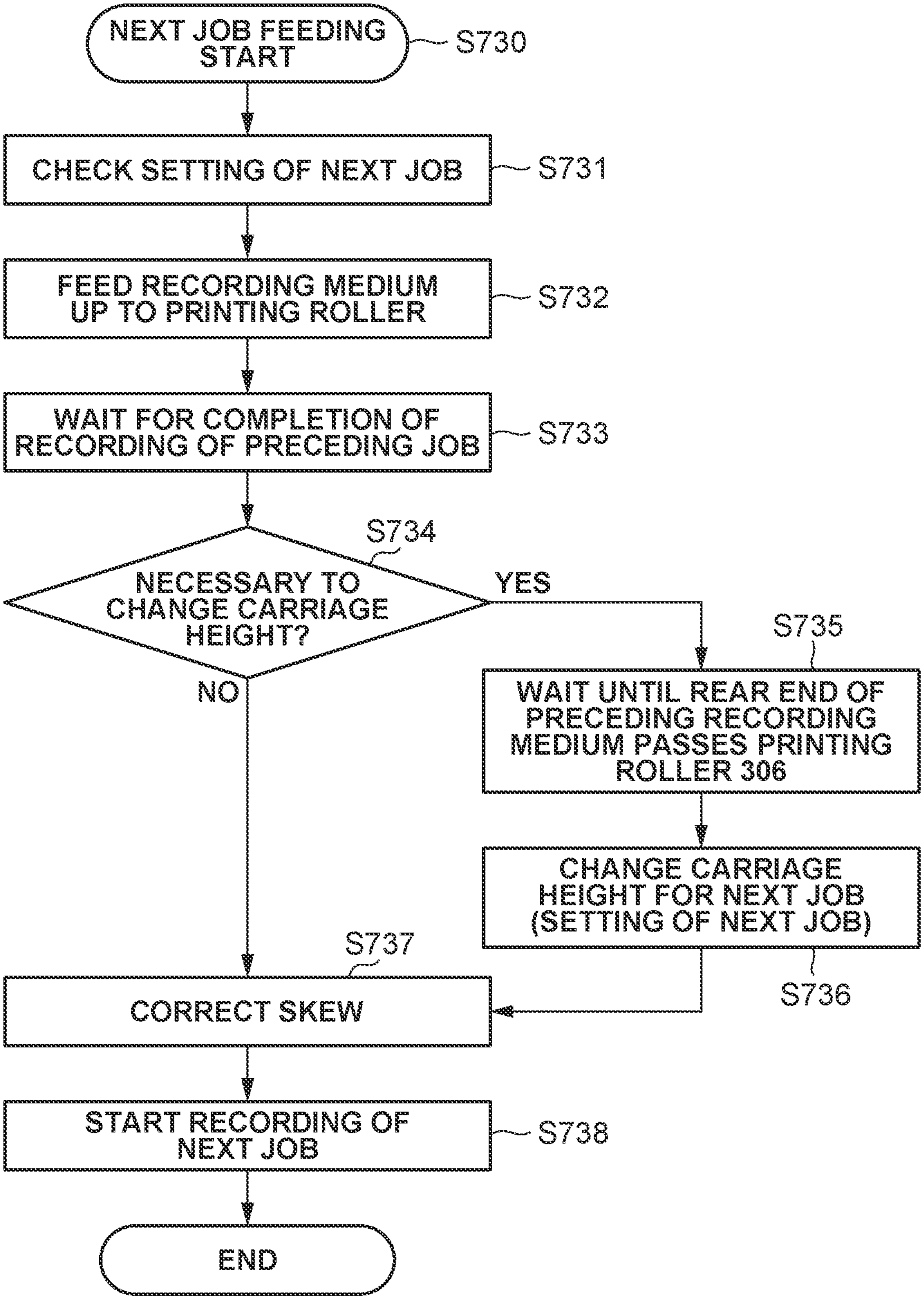
FIG. 10 is a flowchart illustrating a feeding operation of a recording apparatus according to the second exemplary embodiment.

FIG. 10 is a control procedure for starting feeding of a recording medium corresponding to the next job executed in step S705 of FIG. 5. First, in step S731, the job management application 411 checks the setting of the next job received by the IF control module 423. Then, in step S732, for the next job printing, the job management application 411 controls the printer control module 421 to feed a recording medium from a cassette in which the recording medium corresponding to the setting of the next job is stacked, and convey (feed) the recording medium up to the printing roller 305. In step S733, after the recording medium is fed up to the printing roller 305, the process waits for completion of recording on the preceding recording medium.

Next, in step S734, the job setting checked in step S731 is compared with the job setting currently being recorded, and it is determined whether changing of the height of the carriage 360 is necessary. If it is determined that changing is necessary (YES in step S734), in step S735, the process waits until the trailing edge of the preceding recording medium passes the printing roller 306 controlled by the printing motor 352 in order to perform height-changing.

For example, the standby time is set based on the amounts of rotation of the conveyance roller 304 and the printing rollers 305 and 306 after the leading edge of the recording medium is detected by the detection sensor 320. The reason for waiting for the trailing edge of the recording medium to pass through the printing roller 306 is to prevent the recorded recording medium from being drawn by the printing roller 306 when the printing motor 352 is rotated in the reverse direction at the time of switching.

Subsequently, in step S736, the height of the carriage 360 is changed for recording of the next job. Here, by rotating the discharge motor 353 in the forward direction during the height changing of the carriage 360, the preceding recording medium is discharged to the discharge tray 334.

After the height-change in step 736 or in a case where it is determined that the changing is not necessary in step 734 (NO in step S734), in step S737, a skew correction operation is performed to suppress skew of the recording medium.

Thereafter, in step S738, recording of the next job is performed on the recording medium by the recording head 361.

Figure 11:
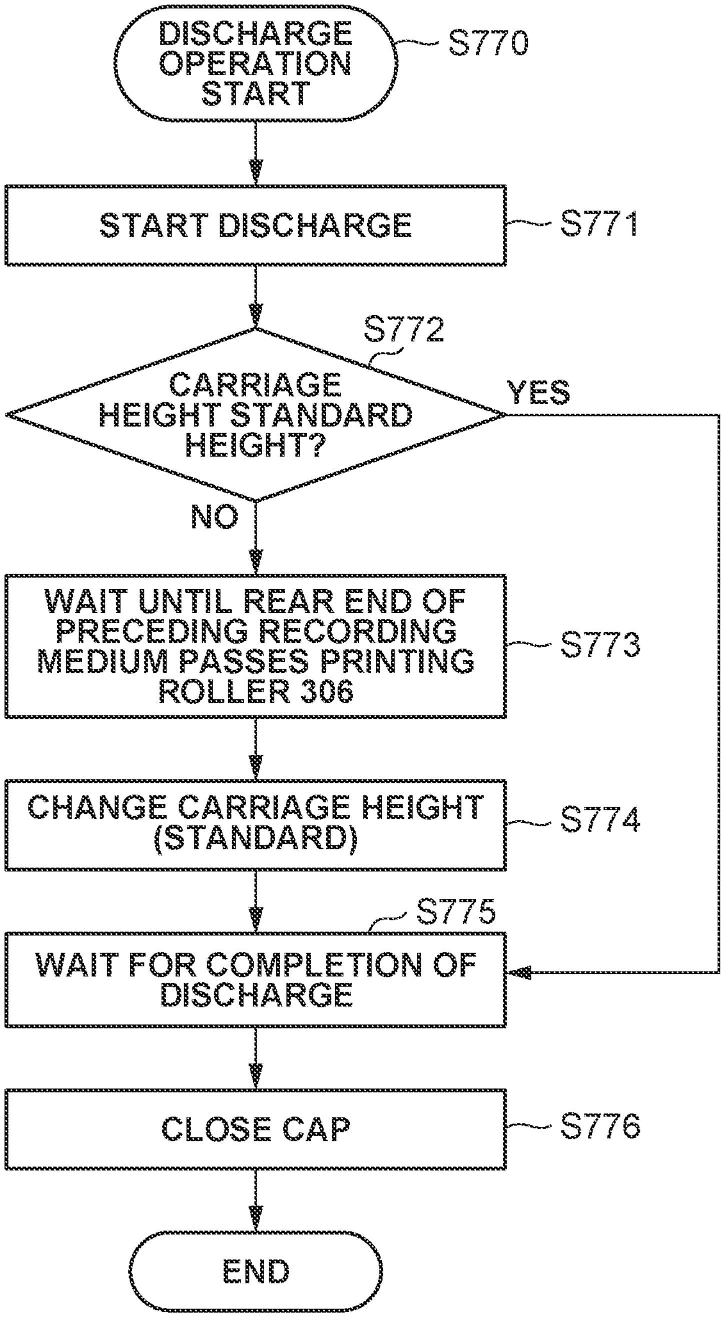
FIG. 11 is a flowchart illustrating a discharge operation of the recording apparatus according to the second exemplary embodiment.

FIG. 11 is a flowchart illustrating a discharge operation of the second exemplary embodiment in step S706 of FIG. 5. When the recording of the job currently being recorded is completed in step 704 of FIG. 5, this flowchart is executed. In order to discharge the recording medium on which recording has been completed, in step 771, discharge is started. Specifically, by rotating the discharge motor 353 in the forward direction, the discharge rollers 307 and 308 are rotated in the forward direction and the recording medium is finally discharged to the discharge tray 334.

In parallel with the discharge operation, in step S772, it is checked whether the current carriage height is a position (standard setting) at which capping can be performed by the cap unit 639. If it is not the cappable position (standard setting) (NO in step S772), in step S773, the process waits until the trailing edge of the preceding recording medium passes the printing roller 306 controlled by the printing motor 352. Then, in step S774, after the trailing edge of the preceding recording medium passes through the printing roller 306, the height of the carriage 360 is changed to the standard setting by the above-described contact between the height-change member 312 and the contact member 641.

Then, in step S775, the process waits until the preceding recording medium is discharged to the discharge tray 334 and the discharge operation is completed. After completion of the discharging operation, in step S776, cap closing for capping the recording head 361 is performed.

According to the above-described control, even in a configuration in which the driving source for changing the height of the carriage 360 is shared with the driving source used for conveying the recording medium, the height changing and at least one of the feeding operation and the discharging operation of the recording medium can be performed in parallel. As a result, the throughput or productivity of the recording operation can be improved also in the configuration of the second exemplary embodiment.

The drive source to be shared is not limited to the printing motor 352, and another motor may be used instead. Also in this case, the height of the carriage 360 may not be changed when the recording medium is conveyed using the shared motor, and the height of the carriage 360 may be switched at a timing when the recording medium is not conveyed.

Other Embodiments

Some embodiments of the present disclosure can also be realized by processing in which a program for carrying out one or more functions of the above-described exemplary embodiments is supplied to a system or an apparatus via a network or a storage medium, and a computer of the system or the apparatus reads and executes the program. The computer has one or more processors or circuits and may include a network of separate computers or separate processors or circuits to read and execute the computer-executable instructions.

A processor or circuit may include a CPU, a microprocessing unit (MPU), a graphics processing unit (GPU), an application specific integrated circuit (ASIC), a field programmable gateway (FPGA). The processor or circuit may also include a digital signal processor (DSP), a data flow processor (DFP), or a neural processing unit (NPU).

The storage medium may also be referred to as a non-transitory computer-readable medium. The storage medium may include one or more hard disks (HD), RAM, ROM, and storage devices of a distributed computing system.

Storage media may also include optical disks (e.g., a compact disk (CD), a digital versatile disk (DVD), or a Blu-ray disk (BD)), flash memory devices, and memory cards.

While the present disclosure has described exemplary embodiments, it is to be understood that some embodiments are not limited to the disclosed exemplary embodiments. The scope of the following claims is to be accorded the broadest interpretation so as to encompass all such modifications and equivalent structures and functions.

This application claims priority to Japanese Patent Application No. 2022-156174, which was filed on Sep. 29, 2022 and which is hereby incorporated by reference herein in its entirety.

What is claimed is:

1. A recording apparatus comprising:
- a recording head configured to eject ink to record an image on a recording medium;
- discharge rollers configured to perform a discharge operation of discharging the recording medium on which the image has been recorded by the recording head to an exterior of the recording apparatus; and
- a height-change member configured to change a height of the recording head simultaneously with the discharge operation of discharging the recording medium on which the image has been recorded.

2. The recording apparatus according to claim 1, further comprising conveying rollers configured to convey the recording medium toward the recording head,
- wherein the height-change member changes the height of the recording head simultaneously with conveyance of the recording medium by the conveying rollers.

3. The recording apparatus according to claim 1, further comprising conveying rollers configured to convey a second recording medium toward the recording head, wherein, simultaneously with the discharge operation of discharging the recording medium on which the image has been recorded, the conveying rollers convey the second recording medium, on which recording is to be performed, toward the recording head.

4. The recording apparatus according to claim 1, further comprising a carriage configured to support the recording head, wherein the carriage moves in a predetermined direction.

5. The recording apparatus according to claim 1, further comprising:

conveying rollers configured to convey the recording medium toward the recording head; and a motor configured to drive the conveying rollers, wherein the height of the recording head is changed by the motor.

6. The recording apparatus according to claim 5, further comprising:

a storage unit configured to store recording media, including the recording medium and a second recording medium;

a feeding unit configured to feed the recording media from the storage unit toward the conveying rollers, wherein, while the height of the recording head is being changed simultaneously with the discharge operation of discharging the recording medium on which the image has been recorded, the feeding unit feeds the second recording medium up to the conveying rollers.

7. The recording apparatus according to claim 6, wherein the height-change member changes the height of the recording head after a trailing edge of the recording medium recorded by the recording head passes through the conveying rollers driven by the motor.

8. The recording apparatus according to claim 6, wherein a type of the second recording medium is different from a type of the recording medium.

9. The recording apparatus according to claim 1, further comprising:

conveying rollers configured to convey the recording medium toward the recording head; and a motor configured to drive the conveying rollers; and a second motor configured to change the height of the recording head.

10. The recording apparatus according to claim 1, further comprising an interface for receiving a recording job.

11. The recording apparatus according to claim 1, further comprising a platen that is disposed at a position facing the recording head and that supports the recording medium, wherein the height-change member changes the height of the recording head with respect to the platen.

12. The recording apparatus according to claim 1, further comprising:

conveying rollers configured to convey a second recording medium toward the recording head, wherein the recording head records the image on the recording medium while the recording head is at a first height, wherein, simultaneously with the discharge operation of discharging the recording medium on which the image has been recorded, the height-change member changes the height of the recording head to a second height different from the first height, and wherein the recording head records a second image on the second recording medium while the recording head is at the second height.

13. A method of controlling a recording apparatus including a recording head configured to record an image, the method comprising:

ejecting ink from a recording head to record an image on a recording medium;

discharging the recording medium on which the image has been recorded by the recording head to an exterior of a recording apparatus; and changing a height of the recording head simultaneously with the discharging of the recording medium on which the image has been recorded by the recording head.

14. The control method according to claim 13, further comprising:

conveying a recording medium toward the recording head; and changing the height of the recording head simultaneously with the conveying.

15. The control method according to claim 13, further comprising conveying a second recording medium, on which recording is to be performed by the recording head, toward the recording head simultaneously with the discharging of the recording medium.

16. A recording apparatus comprising:

a recording head configured to eject ink to record an image on a first recording medium;

discharge rollers configured to discharge the first recording medium on which the image has been recorded by the recording head to an exterior of the recording apparatus;

a height-change member configured to change a height of the recording head;

at least one processor; and at least one memory that is in communication with the at least one processor, wherein the at least one memory stores instructions for causing the at least one processor and the at least one memory to:

simultaneously control the height-change member to change the height of the recording head and control the discharge rollers to discharge the first recording medium on which the image has been recorded by the recording head.

17. The recording apparatus according to claim 16, further comprising:

conveying rollers configured to convey a second recording medium toward the recording head, wherein the at least one memory further stores instructions for causing the at least one processor and the at least one memory to:

simultaneously control the height-change member to change the height of the recording head, control the discharge rollers to discharge the first recording medium, and control the conveying rollers to convey the second recording medium toward the recording head.

18. The recording apparatus according to claim 17, wherein the at least one memory further stores instructions for causing the at least one processor and the at least one memory to control the height-change member to change the height of the recording head after a trailing edge of the first recording medium passes the recording head in a conveyance direction.

19. The recording apparatus according to claim 17, wherein the at least one memory further stores instructions for causing the at least one processor and the at least one memory to:

control the recording head to eject ink to record the image on the first recording medium while the height of the recording head is a first height, wherein the first height corresponds to the type of the first recording medium; and control the height-change member to change the height of the recording head to a second height simultaneously with controlling the discharge rollers to discharge the first recording medium and controlling the conveying rollers to convey the second recording medium toward the recording head, wherein the second height corresponds to the type of the second recording medium, and wherein the first height is different from the second height.

20. The recording apparatus according to claim 19, wherein the at least one memory further stores instructions for causing the at least one processor and the at least one memory to:

control the recording head to eject ink to record a second image on the second recording medium while the height of the recording head is the second height.

* * * * *